April 28, 1942. H. H. CHESNY 2,281,477
MAGNESIA REFRACTORY
Filed Sept. 15, 1937
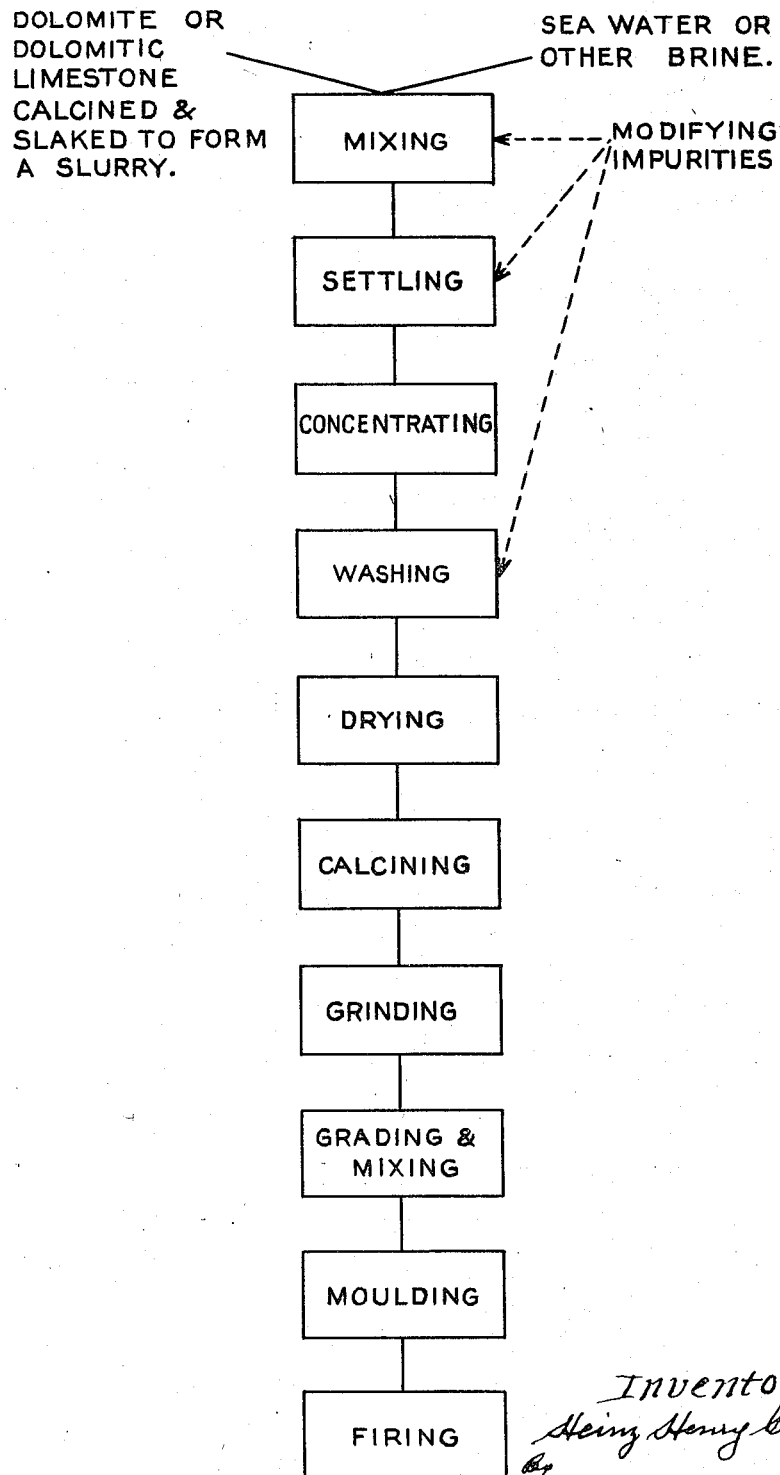

Patented Apr. 28, 1942

2,281,477

UNITED STATES PATENT OFFICE 2,281,477

MAGNESIA REFRACTORY

Heinz Henry Chesny, Worksop, Nottinghamshire, England

Application September 15, 1937, Serial No. 164,088 In Great Britain September 24, 1936

14 Claims. (Cl. 23—201)

This invention is for improvements in or relating to magnesia refractories.

High temperature refractories are produced at present by calcining the mineral magnesite, native $MgCO_3$, at temperatures ranging from 1350° C. to 1800° C.

Sintered magnesite clinker thus produced consists essentially of spherical particles. In order to cement these fragments into a brick or other refractory article, it is necessary that bonding materials should be present. These bonding materials, under the influence of the high temperature employed, form a glass in which the rounded particles are embedded. Native magnesite is relatively impure and contains in the case of high-grade Austrian magnesite approximately 13% of impurities including iron oxide, silicates, alumina and the like, and thus there is generally sufficient bonding material present to bring about a cementing together of the particles. In the case of a chemically purer magnesite such as Grecian magnesite, iron oxide or other flux-forming impurities are added to form the glassy bond. The presence of these impurities causes the formation of compounds possessing relatively low melting points and as a consequence, a softening of the bond occurs causing a slippage of magnesia particles. Ultimately collapse of the brick takes place under conditions of high temperature and load.

The use of native magnesite does not permit of the use of the most advantageous composition of bonding material, due to the fact that the impurities initially present in the mineral cannot be altered, except by the addition of further amounts of impurities. Obviously, the most advantageous composition of a magnesia refractory would be that at which the bonding material is proportioned in such a manner as to permit a sintering just below the maximum temperature at which the refractory is burned due allowance being made also for the presence of other substances, such as chromium compounds, added for the purpose of preventing spalling of the refractory.

I have found that brines containing convertible magnesium salts form a convenient source of magnesia for the production of refractories having the desirable property mentioned above.

In copending application Serial No. 164,087, now Patent No. 2,224,780, I have described a method of separating magnesium hydroxide from calcined dolomite or dolomitic limestone by treatment of a slurry of the calcined material with sea water or brine containing magnesium chloride or magnesium sulphate or both.

The product made in accordance with the above-mentioned specification possesses the advantage of exceptionally high chemical purity and is substantially free from low melting point impurities. As a consequence, it would be difficult to obtain a cementing of the magnesia without a glassy bond, if the material consisted of the usual spherical particles. The magnesia clinker produced from magnesium hydroxide prepared as described above is obtained, however, in the form of needle-like fragments.

The present invention accordingly comprises a process for the manufacture of a refractory material consisting of elongated particles which includes the step of preparing magnesium hydroxide by the treatment of sea water or a brine containing convertible magnesium salts with calcined dolomite or dolomitic limestone. The sea water or brine may be treated with an aqueous slurry of calcined and slaked dolomite or dolomitic limestone.

The invention further comprises a process for the manufacture of dead burnt magnesia in the form of elongated fragments and suitable for use in the production of refractories which comprises treating a brine containing convertible magnesium salts with an aqueous slurry of calcined and slaked dolomite or dolomitic limestone, removing the precipitated magnesium hydroxide and subjecting it to calcination to form a clinker. The precipitated magnesium hydroxide may be purified e. g. by washing prior to drying and calcination.

Coarse crushing of the initial clinker produces fragments measuring on an average 4 mm. in length and 0.5 mm. in width. The fine grinding of the clinker causes its disintegration to its ultimate aggregate size, ranging between 10 microns and 120 microns, the average being about 50 microns, all the fragments being elongated in shape.

The mechanical interlacing of both the finely ground and the coarsely crushed elongated particles forms a particularly strong structure, even in the absence of low melting glass. As a consequence, an exceptionally high refractoriness under load is obtained, and at the same time the bricks made from the product do not spall under conditions of varying temperature.

As an added advantage, the elongated particles are especially useful for fettling, e. g. repairing the refractories in steel furnaces, as the elongated shape of the material causes a particularly good adherence.

In certain cases it is thus unnecessary to add any impurities constituting a bond but in order that any such substances added to the magnesium hydroxide for the purpose of modifying the properties of the clinker may be distributed intimately and uniformly throughout the precipitated magnesium hydroxide the said impurities may be introduced into the brine and/or into the slurry. Alternatively, the impurities may be introduced during or immediately after the formation of the magnesium hydroxide. If the modifying substance is added to the brine before the addition of the slurry, an advantage is that the added modifying substance becomes incorporated in the crystals of magnesium hydroxide as they are formed.

The magnesium hydroxide precipitate is concentrated, washed, filtered, dried and calcined and if desired any added impurities modifying the properties of the clinker may be introduced in liquid with which the magnesium hydroxide is washed prior to drying and calcination. Modifying impurities may include substances such as compounds of calcium, silicon or iron forming with magnesia compounds of lower melting point or substances such as compounds of chromium or zirconium minimizing spalling in the final refractory material. Some of these materials may conveniently be in the form of a solution.

In certain cases it has been found desirable to incorporate in a magnesium oxide refractory a proportion of iron oxide in order to form a bond between the particles of the magnesium oxide and in such cases it has been found that by adding an iron solution, e. g. ferric chloride solution, to the sea water the magnesium oxide finally obtained will contain ferric oxide uniformly distributed throughout the mass. It has further been found that the addition of an iron salt such as ferric chloride brings about an increased rate of settling of the precipitate of magnesium hydroxide.

In an alternative form of the invention, ferric chloride solution (or a solution of another iron salt) may be added to the magnesium hydroxide slurry prior to the washing and filtering steps preceding the dead burning of the final product.

The magnesium hydroxide is preferably concentrated to 30 to 40% solids and is then dried and/or calcined.

It is often advantageous to introduce dried or partially dried material into the retort or kiln in which it is to be finally calcined in the form of small pieces, e. g. of regular shape. These pieces may be formed on a wire belt or may be produced by a moulding or like process. Thus they may be produced by drying the slurry on a belt provided with corrugations or indentations and arranged to pass through a tunnel drier. This method of treatment has the additional advantage that dusting of the dried product is reduced. The drying of the magnesium hydroxide may alternatively be carried out by applying a coating of the wet precipitate to a surface on which it is subsequently dried.

Calcination is carried out at a temperature above 1300° C. in order to shrink and dead burn the magnesia and in the final heating stage of the process it is preferable to employ a temperature of 1600° C. or over. Heat is preferably applied gradually during the initial steps of removing the free and combined water. The resultant clinker may be used as such, or it may be crushed, sieved and graded. The graded material may be re-mixed in the proper proportions of coarse, medium and fine grains, the mixture pressed into the desired shape by first wetting it with water, dried and burned at a temperature sufficient to cause proper bonding.

The resulting refractory material possesses properties superior to those of refractory material produced from magnesite. Thus, refractory material produced by use of the present invention possesses low porosity, high specific gravity, exceptionally high resistance to temperature under load and high resistance to attack by slag. A further special advantage of the magnesia produced in accordance with the present invention is that dead burning may be brought about readily, as the decomposition temperature of the magnesium hydroxide is only a fraction of that of the magnesite ordinarily used.

Following is a description by way of example of methods of carrying the invention into effect.

*Example I*

Magnesium hydroxide is precipitated from treated sea water and a slurry derived from calcined impure dolomite in accordance with the process described in copending application Serial No. 164,087, now Patent No. 2,224,780. The precipitated magnesium hydroxide is concentrated to 30 to 40% solids and is then washed, dried and calcined. The calcined product which is in the form of an agglomeration of elongated particles has the composition:

| | Per cent |
|---|---|
| MgO | 95 |
| CaO | 1.6 |
| $SiO_2$ | 1.7 |
| $R_2O_3$ | 1.7 |
| Alkalies | Trace |

This material, when re-calcined for only one hour at a temperature of 1550° C. in the form of a brick, withstood a temperature of over 1700° C. under a load of fifty pounds per square inch without collapsing.

The magnesium hydroxide may be dried by applying a coating of the wet precipitate to a surface on which it is subsequently heated or it may be introduced directly into a rotary kiln and fired in order to drive off first the free water and then the combined water, the magnesium oxide thus formed being heated further to a temperature above 1300° C. to shrink it and to render it inert. The final step of the heating may be carried out at a temperature of 1600° C. or over.

*Example II*

A relatively pure dolomite is calcined, slaked and treated by the process described in Example I, the precipitated magnesium hydroxide being subsequently concentrated, washed, dried and calcined. The artificial magnesium oxide thus produced was in the form of an agglomeration of elongated particles and had a composition as follows:

| | Per cent |
|---|---|
| MgO | 97.5 |
| CaO | 1.2 |
| $SiO_2$ | 0.8 |
| $R_2O_3$ | 0.5 |
| Alkalies | Trace |

*Example III*

There is added to the sea water employed for the recipitation of magnesium hydroxide from the slurry derived from a calcined dolomite as described in Example II a proportion of ferric chloride solution obtained by the additon of softened sea water to mill scale, the amount of ferric chloride solution being such as to yield 2.5% $Fe_2O_3$ in the magnesium oxide refractory finally produced.

The softening of the sea water by the removal of calcium therefrom and the precipitation of the magnesium hydroxide and its subsequent calcination to form dead burnt magnesium oxide are carried out as described in Example I. Alternatively, the magnesium hydroxide slurry may be converted to magnesium oxide by drying and calcining the slurry while pasted into the meshes of a wire belt, the calcined material being removed from the belt by tapping.

In an alternative method of preparing a high temperature magnesia refractory containing a relatively small proportion of a substance such as iron oxide which forms a bond between the elongated particles of the dead burnt magnesium oxide, a solution of the material to be added, e. g. ferric chloride may be mixed with the liquid with which the magnesium hydroxide slurry is washed immediately prior to drying and calcination.

Example IV

In the production of a refractory magnesia brick from clinker prepared as described in the preceding examples the clinker is crushed, sieved and graded. The graded material is re-mixed in the proper proportions of coarse, medium and fine grains, such for example as follows:

|  | Per cent |
|---|---|
| 7 to 25 mesh I. M. M | 22 |
| 25 to 72 mesh I. M. M | 30 |
| Through 72 mesh I. M.M | 48 |

The mixture is moulded into the desired shape, preferably by first wetting it with water, to which a proportion of binder may be added, and is dried and burned at a temperature sufficient to cause proper binding. The resulting brick has a high specific gravity, low porosity and high resistance to attack by slag and to deformation under load at high temperatures.

The accompanying diagrammatic drawing illustrates one embodiment of the present process in which a slurry of calcined and slaked dolomite or dolomitic lime is mixed with sea water and the precipitate of magnesium hydroxide is concentrated, washed, dried and calcined. The calcined product may be ground, graded, mixed if desired with other materials, moulded into the form of the refractory article to be produced and fired.

Modifying impurities, if added, may be introduced when the dolomitic slurry is being mixed with the sea water or at the settling or washing stages.

I claim.

1. A dead burnt magnesium oxide clinker consisting of agglomerates of long and relatively thin particles.

2. A ground dead burnt magnesium oxide clinker the coarsely crushed particles whereof average 4 mm. in length and 0.5 mm. in thickness and the finely ground fraction whereof contains elongated particles ranging between 10 microns and 120 microns in length.

3. A synthetic dead burnt magnesium oxide clinker consisting of agglomerates of elongated particles the length of the coarsely crushed particles whereof varies between 6 and 12 times their diameter.

4. A synthetic dead burnt magnesium oxide clinker consisting of ultimate particles 30 to 70 microns in length and agglomerated to form needle-like fragments over 1 mm. in length.

5. A molded and burnt refractory article consisting of a moulded mixture containing crushed and graded dead burnt magnesium oxide clinker in the form of long and relatively thin particles.

6. Dead burnt magnesium oxide clinker in the form of elongated particles, the lengths of which are many times the diameters thereof.

7. A process for the manufacture of a granular refractory material comprising elongated particles of dead burnt magnesia which includes the steps of preparing crystalline magnesium hydroxide by the treatment of a brine having substantially the property of sea water of containing convertible magnesium salts with a slurry of calcined dolomite or dolomitic limestone and dead burning the crystalline magnesium hydroxide so prepared.

8. A process for the manufacture of a granular refractory material comprising dead burnt magnesia in the form of agglomerates of elongated fragments which includes the steps of preparing crystalline magnesium hydroxide by the interaction of an aqueous solution having substantially the property of sea water of containing convertible magnesium salts and a slurry of calcined and slaked dolomite or dolomitic limestone and dead burning the crystalline magnesium hydroxide so obtained.

9. The herein described process for the manufacture of a granular refractory material comprising elongated particles of dead burnt magnesia which includes the steps of reacting together a brine having the characteristic property of sea water of containing convertible magnesium salts and an aqueous slurry of calcined and slaked dolomite or dolomitic limestone, separating off the precipitated crystalline magnesium hydroxide so formed and dead burning the magnesium hydroxide to form a clinker.

10. A process as claimed in claim 9 wherein the crystalline magnesium hydroxide is washed free from soluble impurities prior to being subjected to dead burning to form a clinker of magnesia.

11. The herein described process for the manufacture of a refractory material comprising dead burnt magnesia in the form of elongated particles which process comprises reacting a brine having substantially the property of sea water of containing convertible magnesium salts and an aqueous slurry of calcined and slaked dolomite or dolomitic limestone to form crystalline magnesium hydroxide, separating off the said crystalline magnesium hydroxide, concentrating the said crystalline magnesium hydroxide to form a pasty mass containing between 28% and 40% solids and subjecting the said mass to dead burning in a rotary kiln to form a clinker.

12. The herein described process for the manufacture of a granular refractory material comprising dead burnt magnesia in the form of elongated particles which process comprises reacting together a brine having the characteristic property of sea water of containing convertible magnesium salts and an aqueous slurry of calcined and slaked dolomite or dolomitic limestone to form a precipitate of crystalline magnesium hydroxide, removing the crystalline magnesium hydroxide from the liquid, drying it in the form of relatively small pieces and dead burning said small pieces to form a clinker.

13. A process for the manufacture of dead burnt magnesia in the form of elongated particles which comprises calcining dolomite to convert substantially all the carbonate to oxide, forming a slurry of the calcined dolomite, mixing the slurry with a brine having the property of sea water of containing convertible magnesium salts in a vessel to which the brine is admitted so as to impart to the body of liquid a gentle rotary or swirling motion, introducing the slurry below the surface of the brine so as to prevent or minimize the formation of hydrous magnesium hydroxide, separating the precipitated crystalline magnesium hydroxide from the liquid, drying the crystalline magnesium hydroxide thereafter dead burning it to form a clinker.

14. A process as claimed in claim 9 in which the precipitated crystalline magnesium hydroxide is concentrated to approximately 30% or 40% solids prior to the dead burning thereof and in which the dead burning is carried out at a temperature of above 1300° C.

HEINZ HENRY CHESNY.